(12) United States Patent
Kaji (10) Patent No.: US 6,311,799 B1
(45) Date of Patent: Nov. 6, 2001

(54) POWER STEERING APPARATUS (75) Inventor: Hiroaki Kaji, Yamatokooriyama (JP)

(73) Assignee: Koyo Seiko Co. Ltd., Osaka (JP)

( * ) Notice: Subject to any disclaimer, the term of this patent is extended or adjusted under 35 U.S.C. 154(b) by 0 days.

(21) Appl. No.: 09/397,123

(22) Filed: Sep. 16, 1999

(30) Foreign Application Priority Data

Sep. 18, 1998 (JP) .................................. 10-265216

(51) Int. Cl.⁷ .................................. B62D 5/06; B62D 5/04
(52) U.S. Cl. ........................ 180/422; 180/446; 701/41
(58) Field of Search ................... 180/421, 422, 180/423, 443, 446; 701/41, 42

(56) References Cited

U.S. PATENT DOCUMENTS

| | | | | |
|---|---|---|---|---|
| 4,541,499 | * | 9/1985 | Yanai et al. | 180/142 |
| 4,664,211 | * | 5/1987 | Oshita et al. | 180/142 |
| 4,688,655 | * | 8/1987 | Shimizu | 180/79.1 |
| 4,745,984 | * | 5/1988 | Shimizu | 180/79.1 |
| 4,800,976 | * | 1/1989 | Okada et al. | 180/142 |
| 5,265,019 | * | 11/1993 | Harara et al. | 364/424.05 |
| 5,299,684 | * | 4/1994 | Watanabe et al. | 180/79.1 |
| 5,481,457 | * | 1/1996 | Yamamoto et al. | 364/424.05 |
| 5,767,642 | * | 6/1998 | Furukawa | 318/286 |
| 5,907,277 | * | 5/1999 | Tokunaga | 340/441 |
| 5,984,042 | * | 11/1999 | Nishimoto et al. | 180/446 |
| 6,062,012 | * | 7/2000 | Shimizu et al. | 701/41 |
| 6,112,845 | * | 9/2000 | Oyama et al. | 180/443 |
| 6,144,909 | * | 11/2000 | Sakamaki et al. | 701/41 |
| 6,158,545 | * | 12/2000 | Kaji et al. | 180/446 |
| 6,161,069 | * | 12/2000 | Fujita | 701/42 |
| 6,216,814 | * | 4/2001 | Fujita et al. | 180/422 |
| 6,227,328 | * | 5/2001 | Shimizu | 180/422 |

FOREIGN PATENT DOCUMENTS 59-118577    7/1984   (JP) .

* cited by examiner

*Primary Examiner*—Robert P. Olszewski
*Assistant Examiner*—Andrew J. Fischer
(74) *Attorney, Agent, or Firm*—Rabin & Berdo, P.C.

(57) ABSTRACT

A power steering apparatus which generates a steering assist force to be applied to a steering mechanism by a hydraulic pressure generated by a pump driven by an electric motor. The apparatus determines a rotation speed of the motor in accordance with a steering angular speed sensed when the steering mechanism is operated. The motor is driven at a lower motor rotation speed when the steering mechanism is operated toward a steering angle midpoint than when the steering mechanism is operated away from the steering angle midpoint.

4 Claims, 6 Drawing Sheets

POWER STEERING APPARATUS

BACKGROUND OF THE INVENTION

1. Field of the Invention

The present invention relates to a power steering apparatus which applies a steering assist force to a steering mechanism by a hydraulic pressure generated by a pump driven by an electric motor.

2. Description of Related Art

Power steering apparatuses are conventionally used which assist operation of a steering wheel by supplying a working oil from an oil pump to a power cylinder coupled to a steering mechanism. In such a power steering apparatus, the oil pump is driven by an electric motor such as a brushless motor, and a steering assist force is generated by the power cylinder in accordance with the rotation speed of the electric motor.

Figure 6:
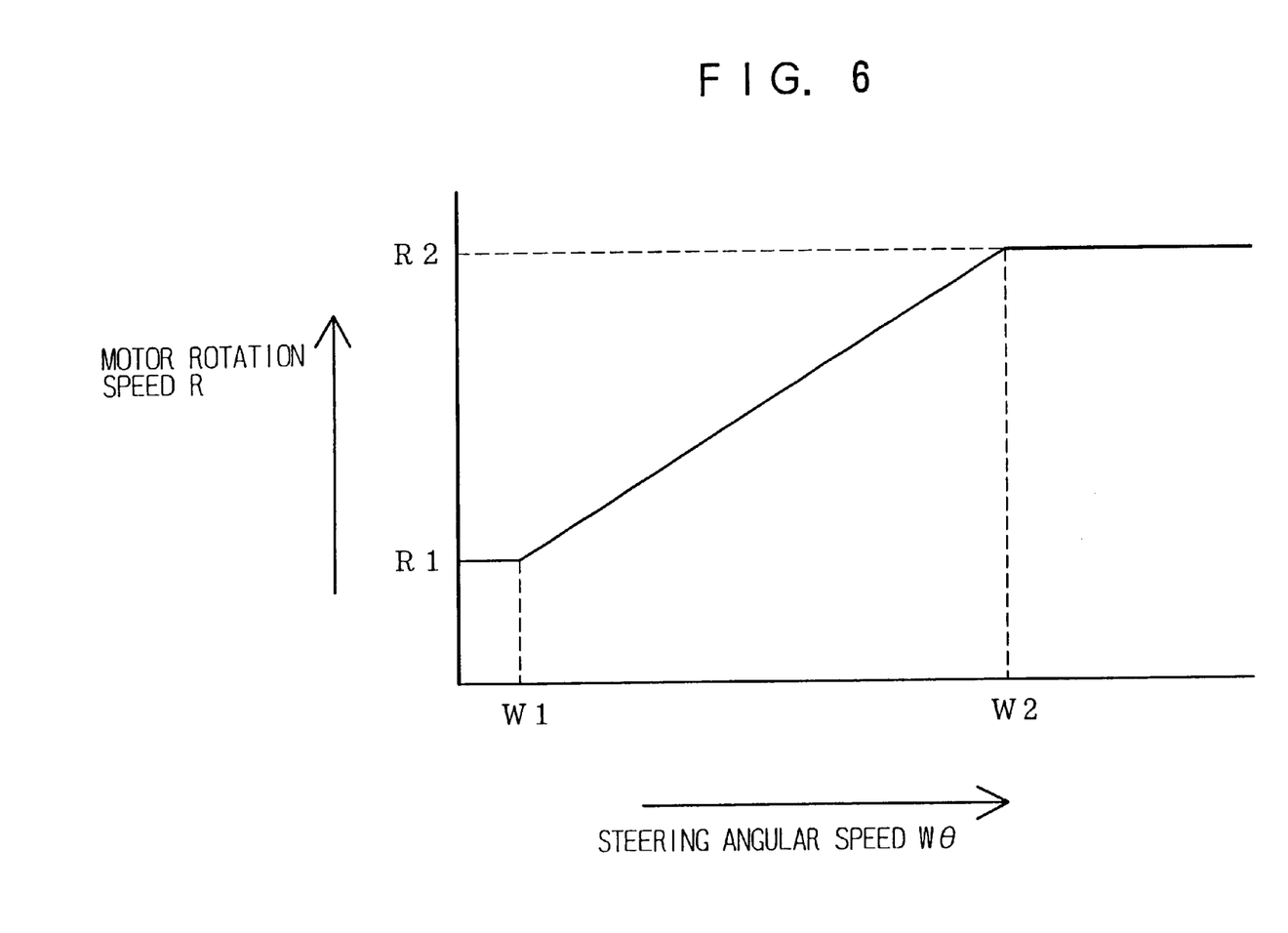
FIG. 6 is a graph for explaining conventional drive control of a motor.

Drive control of the electric motor is performed, for example, on the basis of a steering angular speed which is a time-related change amount of a steering angle observed when a steering wheel is operated. As shown in FIG. 6, if a steering angular speed $W\theta$ is not greater than a first threshold $W1$, a motor rotation speed $R$ is kept at a first rotation speed $R1$. If the steering angular speed $W\theta$ is not smaller than a second threshold $W2$ which is greater than the first threshold $W1$, the motor rotation speed $R$ is kept at a second rotation speed $R2$ which is greater than the first rotation speed $R1$. If the steering angular speed $V\theta$ is within a range between the first threshold $W1$ and the second threshold $W2$, the motor rotation speed $R$ is varied generally linearly with the steering angular speed $W\theta$ between the first rotation speed $R1$ and the second rotation speed $R2$.

Thus, a greater steering assist force is generated as the steering wheel is operated more quickly. Hence, the steering assist can properly be provided.

When the steering wheel is returned to a steering angle midpoint (a steering angle which corresponds to an angular position of the steering wheel in straight traveling) after having been turned in one direction, a self-alignment torque is exerted on the steering mechanism due to a reverse input from tires to return the steering wheel to the steering angle midpoint. Therefore, a great steering assist force as required to turn the steering wheel is not necessary.

Nevertheless, the conventional power steering apparatus is adapted to perform the aforesaid control irrespective of the direction of the operation of the steering wheel. Even if a great steering assist force is not required, the rotation speed of the electric motor is increased in response to abrupt operation of the steering wheel. Therefore, wasteful energy consumption is inevitable.

Further, smooth return of the steering wheel to the steering angle midpoint by utilizing the self-alignment torque may be prevented in the conventional power steering apparatus.

SUMMARY OF THE INVENTION

It is an object of the present invention to provide a power steering apparatus which features an enhanced energy saving.

It is another object of the present invention to provide a power steering apparatus which ensures smooth return of a steering wheel to a steering angle midpoint.

The power steering apparatus according to the present invention, which is adapted to generate a steering assist force to be applied to a steering mechanism by a hydraulic pressure generated by a pump driven by an electric motor, comprises: steering direction detection means for sensing a direction of steering operation of the steering mechanism; steering angular speed detection means for sensing a steering angular speed when the steering mechanism is operated; and motor control means for determining a rotation speed of the motor in accordance with the steering angular speed sensed by the steering angular speed detection means and controlling driving of the electric motor on the basis of an output of the steering direction detection means so that the motor rotation speed is set at a lower value when the steering mechanism is operated toward a steering angles midpoint than when the steering mechanism is operated away from the steering angle midpoint.

In accordance with the present invention, the motor rotation speed is set at a lower value when the steering mechanism is operated toward the steering angle midpoint than when the steering mechanism is operated away from the steering angle midpoint. This prevents the power steering apparatus from applying an excessively great steering assist force to the steering mechanism when the steering mechanism is operated toward the steering angle midpoint, thereby enhancing the energy saving of the apparatus.

The motor control means preferably determines the motor rotation speed with respect to the steering angular speed sensed by the steering angular speed detection means in accordance with a first characteristic line which defines a relationship between the steering angular speed and the motor rotation speed for the steering operation away from the steering angle midpoint, and in accordance with a second characteristic line which defines a relationship between the steering angular speed and the motor rotation speed for the steering operation toward the steering angle midpoint. In this case, it is preferable that the second characteristic line defines the relationship such that the steering angular speed with respect to the motor rotation speed is greater than that defined by the first characteristic line.

In this case, the first and second characteristic lines may each be defined so that the motor rotation speed varies generally linearly with the steering angular speed.

The first and second characteristic lines may be parallel to each other (or the second characteristic line may be obtained through parallel shift of the first characteristic line). Particularly where the first and second characteristic lines are linear, these characteristic lines may have different inclinations. Where the first and second characteristic lines have different inclinations, the second characteristic line preferably has a smaller inclination than the first characteristic line. Alternatively, the second characteristic line may be obtained, for example, by shifting the first characteristic line in parallelism and changing the inclination of the resulting characteristic line.

Where a lower limit is set for the rotation speed of the electric motor, a range of the steering angular speed for which the motor is to be rotated at the lower limit motor rotation speed may be changed. More specifically, the first characteristic line and the second characteristic line may respectively have thresholds which each define a boundary between the range of the steering angular speed for which the motor is to be rotated at the lower limit motor rotation speed and a range of the steering angular speed for which the motor rotation speed is varied in accordance with an increase in the steering angular speed (e.g., generally linearly with an increase in the steering angular speed).

Similarly, where an upper limit is set for the rotation speed of the electric motor, a range of the steering angular speed for which the motor is to be rotated at the upper limit motor rotation speed may be changed. More specifically, the first characteristic line and the second characteristic line may respectively have thresholds which each define a boundary between the range of the steering angular speed for which the motor is to be rotated at the upper limit motor rotation speed and the range of the steering angular speed for which the motor rotation speed is varied in accordance with an increase in the steering angular speed (e.g., generally linearly with an increase in the steering angular speed).

In accordance with the present invention, the steering angular speed with respect to the motor rotation speed is set greater on the second characteristic line than on the first characteristic line which is to be employed for the steering operation away from the steering angle midpoint. Therefore, when the steering mechanism is operated toward the steering angle midpoint, the motor rotation speed with respect to the steering angular speed is determined in accordance with the second characteristic line, so that the rotation speed of the electric motor can be set at a lower value than when the steering mechanism is operated away from the steering angle midpoint.

The foregoing and other objects, features and effects of the present invention will become more apparent from the following description of the preferred embodiments with reference to the attached drawings.

DESCRIPTION OF THE PREFERRED EMBODIMENTS

Figure 1:
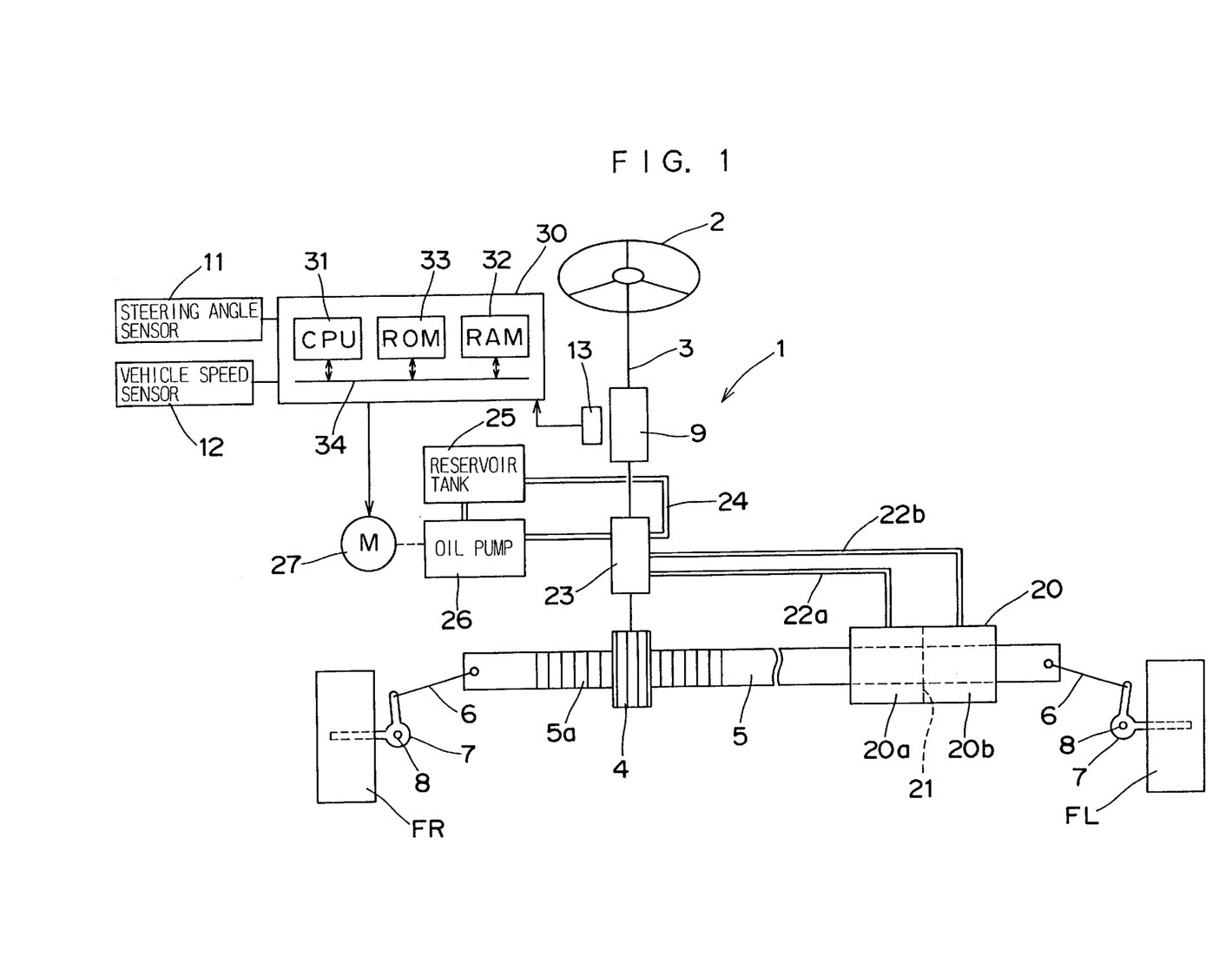
FIG. 1 is a conceptual diagram illustrating the basic construction of a power steering apparatus according to one embodiment of the present invention.

FIG. 1 is a conceptual diagram illustrating the basic construction of a power steering apparatus according to one embodiment of the present invention. This power steering apparatus is provided in association with a steering mechanism 1 of a motor vehicle for applying a steering assist force to the steering mechanism 1.

The steering mechanism 1 includes a steering wheel 2 to be operated by a driver, a steering shaft 3 coupled to the steering wheel 2, a pinion gear 4 provided at a distal end of the steering shaft 3, and a rack shaft 5 having a rack gear 5a meshed with the pinion gear 4 and extending transversely of the motor vehicle. Tie rods 6 are connected to opposite ends of the rack shaft 5, and further connected to knuckle arms 7 which respectively support left and right front wheels FL and FR as steerable wheels. The knuckle arms 7 are respectively provided rotatably about king pins 8.

With this arrangement, when the steering wheel 2 is operated to rotate the steering shaft 3, the rotational motion is converted into a linear motion transverse to the motor vehicle by the pinion gear 4 and the rack shaft 5. The linear motion is converted into rotational motions of the knuckle arms 7 about the king pins 8, thereby achieving the steering of the left and right front wheels FL, FR.

A torsion bar 9 and a hydraulic pressure control value 23 are incorporated in the steering shaft 3. The torsion bar 9 is adapted to be twisted in accordance with the direction and magnitude of a steering torque applied to the steering wheel 2. The hydraulic pressure control valve 23 is adapted to change its valve aperture in accordance with the direction and magnitude of the torsion of the torsion bar 9. The hydraulic pressure control valve 23 is connected to a power cylinder 20 for applying a steering assist force to the steering mechanism 1. The power cylinder 20 includes a piston 21 provided integrally with the rack shaft 5, and a pair of cylinder chambers 20a and 20b split by the piston 21. The cylinder chambers 20a and 20b are connected to the hydraulic pressure control valve 23 via oil supply/return lines 22a and 22b, respectively.

The hydraulic pressure control valve 23 is interposed in an oil circulation line 24 which extends through a reservoir tank 25 and an oil pump 26. The oil pump 26 is driven by an electric motor 27, so that a working oil contained in the reservoir tank 25 is pumped up and supplied to the hydraulic pressure control valve 23. An excess of the working oil is returned to the reservoir tank 25 from the hydraulic pressure control valve 23 via the oil circulation line 24.

When a torsion is exerted on the torsion bar 9 in one direction, the hydraulic pressure control valve 23 supplies the working oil to one of the cylinder chambers 20a, 20b of the power cylinder 20 via one of the oil supply/return lines 22a, 22b. When a torsion is exerted on the torsion bar 9 in the other direction, the hydraulic pressure control valve supplies the working oil to the other of the cylinder chambers 20a, 20b via the other of the oil supply/return lines 22a, 22b. When virtually no torsion is exerted on the torsion bar 9, the hydraulic pressure control valve 23 is in a so-called equilibrium state, so that the working oil is not supplied to the power cylinder 20 but circulated in the oil circulation line 24. When the working oil is supplied to either one of the cylinder chambers of the power cylinder 20, the piston 21 moves transversely of the motor vehicle. Thus, a steering assist force acts on the rack shaft 5.

An exemplary construction of the hydraulic pressure control valve is disclosed in detail, for example, in Japanese Unexamined Patent Publication No. 59-118577 (1984) and U.S. patent application Ser. No. 733,644, the disclosure of which is incorporated herein by reference.

The magnitude of the steering assist force is adjusted by controlling a voltage to be applied to the electric motor 27 which drives the oil pump 26. The voltage to be applied to the electric motor 27 is controlled by an electronic control unit 30. The electronic control unit 30 includes a CPU 31, a RAM 32 which provides a work area for the CPU 31, a ROM 33 storing therein operation programs for the CPU 31, and buses 34 interconnecting these components. The electronic control unit 30 is operative in accordance with the operation programs to determine the voltage to be applied to the motor 27 on the basis of an output signal of a steering angle sensor 11 for sensing the steering angle of the steering wheel 2, an output signal of a vehicle speed sensor 12 for sensing a vehicle speed and an output signal of a torque sensor 13 for sensing the direction and magnitude of a torque applied to the torsion bar 9. Thus, the steering assist force is applied to the steering mechanism 1 in accordance with the steering angle, the vehicle speed and the steering torque.

The steering angle sensor 11 which is, for example, a two-phase steering angle sensor capable of sensing the direction of a steering operation, is provided in association with the steering wheel 2. The steering angle sensor 11 sets a steering angle of the steering wheel 2 observed when an ignition key switch of the vehicle is actuated for startup of an engine at an initial level "0", and outputs steering angle data which has a value corresponding to a steering angle relative to the initial level and a sign corresponding to a steering direction.

The vehicle speed sensor 12 may be adapted to directly sense the vehicle speed or, alternatively, adapted to calculate the vehicle speed on the basis of output pulses of wheel speed sensors provided in association with the wheels.

Figure 2:
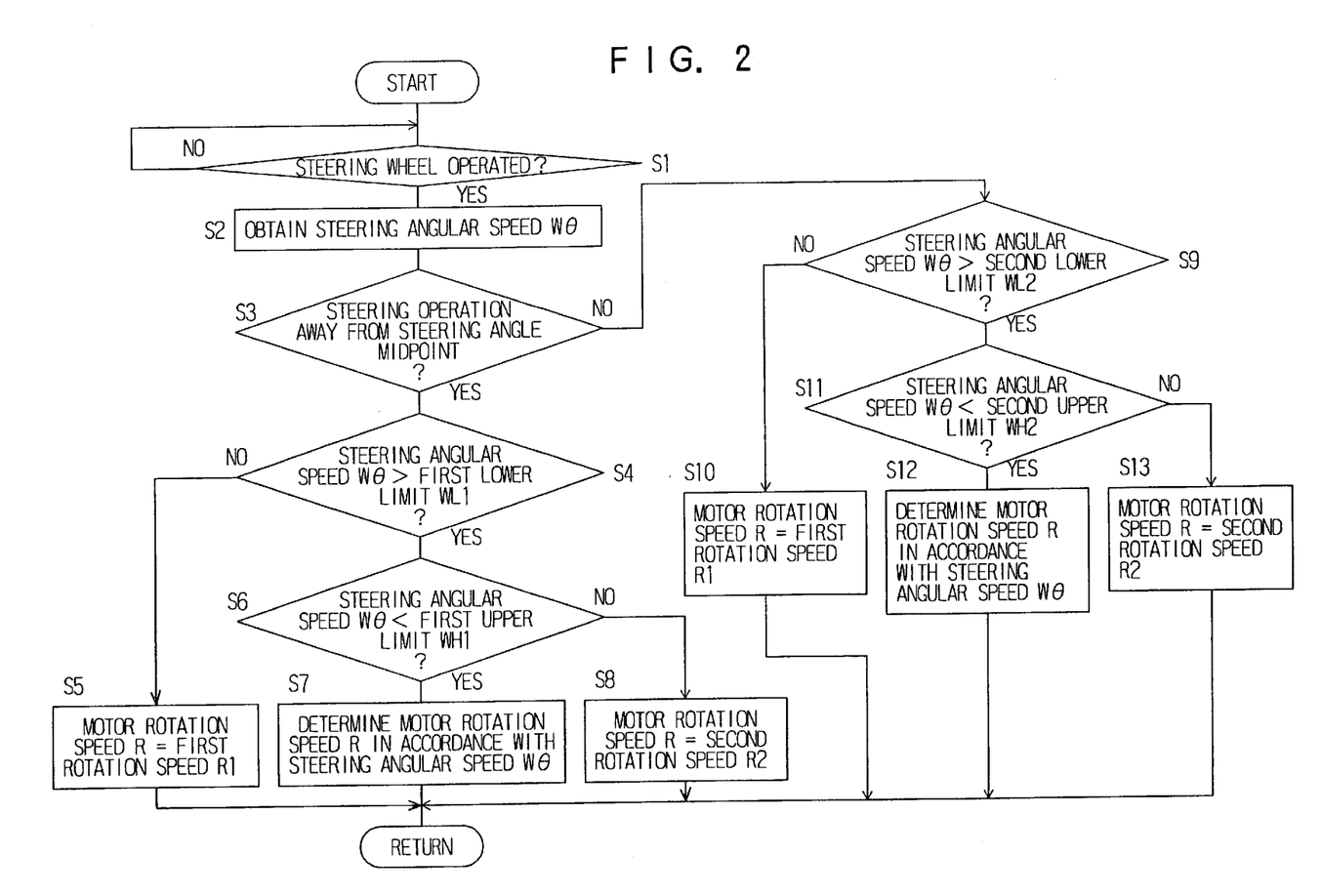
FIG. 2 is a flow chart for explaining the operation of an electronic control unit for drive control of an electric motor.
Figure 3:
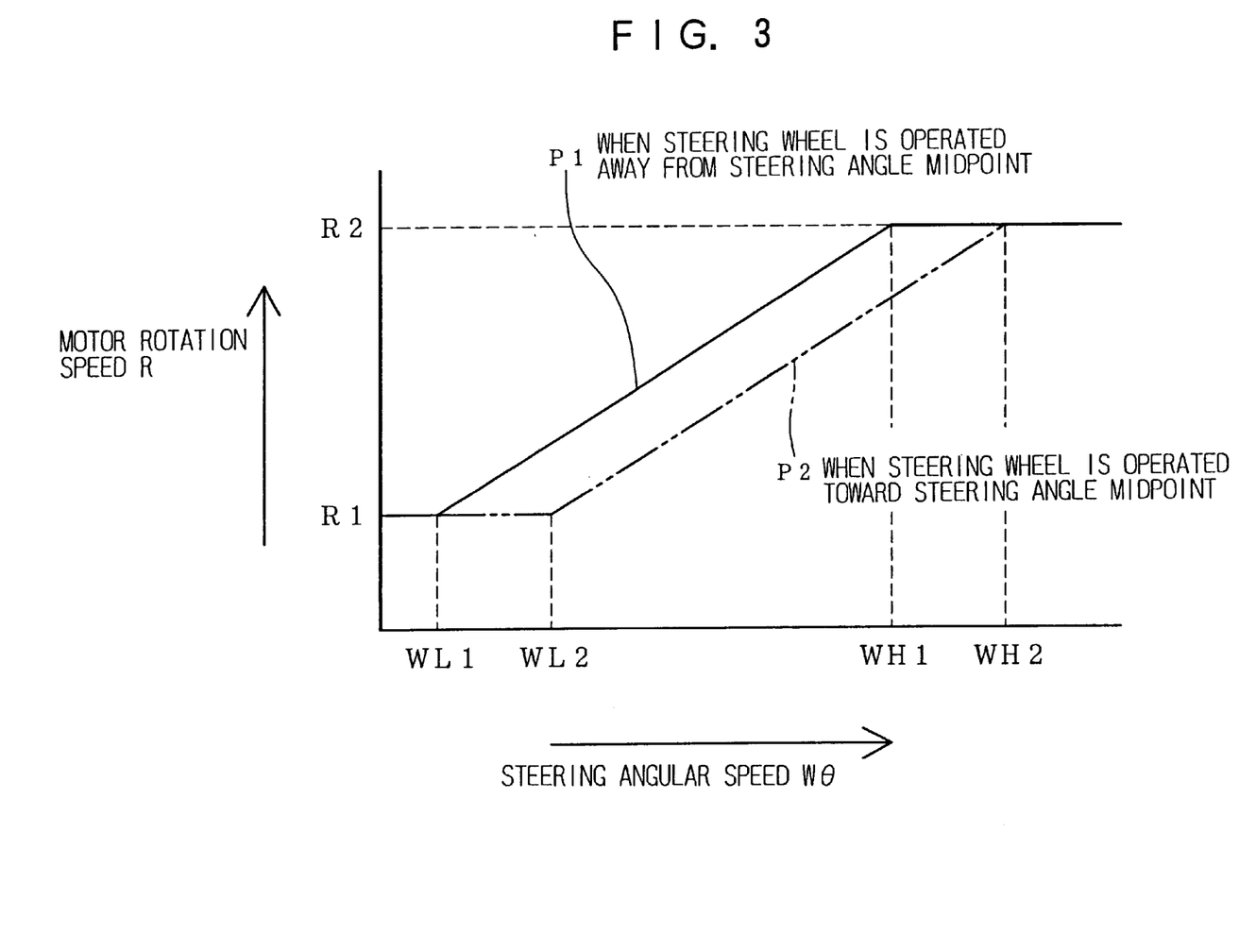
FIG. 3 is a graph showing exemplary setting of a motor rotation speed with respect to a steering angular speed.

FIG. 2 is a flow chart for explaining the operation of the electronic control unit 30 for drive control of the electric motor 27, and FIG. 3 is a graph showing exemplary setting of a motor rotation speed with respect to a steering angular speed. With reference to FIG. 3, the drive control of the electric motor 27 will hereinafter be described in accordance with the flow chart of FIG. 2.

The electronic control unit 30 judges, on the basis of the output of the steering angle sensor 11, whether or not the steering wheel 2 is operated (Step S1). The following process is not performed until the steering wheel 2 is operated. In response to the operation of the steering wheel 2, a steering angular speed $W\theta$ which is a time-related change rate of the steering angle of the steering wheel 2 is determined on the basis of the steering angle data outputted from the steering angle sensor 11 (Step S2). Further, it is judged, on the basis of the steering angle data from the steering angle sensor 11, whether the steering wheel 2 is operated away from a steering angle midpoint or toward the steering angle midpoint (Step S3).

The steering angle midpoint is a steering angle of the steering wheel 2 observed when the vehicle is traveling straight. The electronic control unit 30, for example, samples steering angle data outputted from the steering angle sensor 11 after the ignition key switch of the vehicle is actuated, and prepares a histogram of values of the steering angle data. After a predetermined number of data are sampled, the electronic control unit 30 determines the most frequent steering angle data, which is regarded as steering angle data corresponding to the steering angle midpoint. The steering angle data of the steering angle midpoint thus determined is stored in the RAM 32 incorporated in the electronic control unit 30. In Step S3, the electronic control unit 30 judges whether or not the steering wheel 2 is operated away from the steering angle midpoint or toward the steering angle midpoint, on the basis of the steering angle data from the steering angle sensor 11 and the steering angle data of the steering angle midpoint retained in the RAM 32.

If the steering wheel 2 is operated away from the steering angle midpoint, the electronic control unit 30 judges whether or not the steering angular speed $W\theta$ determined in Step S2 is greater than a predetermined first lower limit WL1 (Step S4). If the steering angular speed $W\theta$ is not greater than the first lower limit WL1, the electric motor 27 is driven so that the motor rotation speed R is equated to a predetermined first rotation speed R1 (Step S5).

If the steering angular speed $W\theta$ is greater than the first lower limit WL1, it is judged whether or not the steering angular speed $W\theta$ is smaller than a first upper limit WH1 which is greater than the first lower limit WL1 (step S6). If the steering angular speed $W\theta$ is smaller than the first upper limit WH1, the electronic control unit 30 drives the motor 27 at a motor rotation speed R according to the steering angular speed $W\theta$ (Step S7). That is, if the steering angular speed $W\theta$ is within a range which is greater than the first lower limit WL1 and smaller than the, first upper limit WH1, the electronic control unit 30 determines the motor rotation speed R in accordance with a characteristic line P1 which defines a relationship between the steering angular speed $W\theta$ and the motor rotation speed R such that the motor rotation speed R varies generally linearly with the steering angular speed $W\theta$ between the first rotation speed R1 and a second rotation speed. R2 (R2>R1).

If the steering angular speed $W\theta$ is not smaller than the first upper limit WH1, the electronic control unit 30 drives the motor 27 so that the motor rotation speed R is equated to the second rotation speed R2 (Step S8). That is, if the steering angular speed $W\theta$ is not smaller than the first upper limit WH1, the motor 27 is driven constantly at the second rotation speed R2 irrespective of the steering angular speed $W\theta$.

If the steering wheel is operated toward the steering angle midpoint (NO in Step S3), the electronic control unit 30 judges whether or not the steering angular speed $W\theta$ determined in Step S2 is greater than a second lower limit WL2 which is greater than the first lower limit WL1 (Step S9). If the steering angular speed $W\theta$ is not greater than the second lower limit WL2, the electric motor 27 is driven so that the motor rotation speed R is equated to the predetermined first rotation speed R1 (Step S10)

If the steering angular speed $W\theta$ is greater than the second lower limit WL2, it is judged whether or not the steering angular speed $W\theta$ is smaller than a second upper limit WH2 which is greater than the first upper limit WH1 (Step S11). If the steering angular speed WE is smaller than the second upper limit WH2, the electronic control unit 30 determines the motor rotation speed R in accordance with a characteristic line P2 which defines a relationship between the steering angular speed $W\theta$ and the motor rotation speed R such that the motor rotation speed R varies generally linearly with the steering angular speed $W\theta$ between the first rotation speed R1 and the second rotation speed R2, and drives the motor 27 at the motor rotation speed R thus determined (Step S12). If the steering angular speed $W\theta$ is not smaller than the second upper limit WH2, the electronic control unit 30 drives the electric motor 27 so that the motor rotation speed R is equated to the second rotation speed R2.

In accordance with this embodiment, a range of the steering angular speed $W\theta$ for which the motor 27 is to be rotated at the first rotation speed R1 differs between a case where the steering wheel 2 is operated away from the steering angle midpoint and a case where the steering wheel 2 is operated toward the steering angle midpoint. More specifically, in the steering operation away from the steering angle midpoint, a threshold that defines a boundary between the range of the steering angular speed for which the electric motor 27 is to be rotated at the first rotation speed R1 and a range of the steering angular speed for which the motor rotation speed is varied generally linearly with an increase in the steering angular speed is set at the first lower limit WL1. On the other hand, in the steering operation toward the steering angle midpoint, the threshold is set at the second lower limit WL2 which is greater than the first lower limit WL1.

As shown in FIG. 3, the characteristic line P2 which is to be employed for the determination of the motor rotation speed R in the steering operation toward the steering angle midpoint is obtained through rightward parallel shift of the characteristic line P1 which is to be employed for the determination of the motor rotation speed R in the steering operation away from the steering angle midpoint. That is, the steering angular speed with respect to the motor rotation speed is greater in the steering operation toward the steering angle midpoint than in the steering operation away from the steering angle midpoint. Accordingly, where the steering wheel 2 is operated toward the steering angle midpoint so that a self-alignment torque is exerted on the steering mechanism 1, the motor rotation speed R with respect to the same steering angular speed Wθ is set at a lower level than where the steering wheel is operated away from the steering angle midpoint. Therefore, in the steering operation toward the steering angle midpoint, the power consumption of the electric motor 27 can be reduced, whereby the energy saving of the power steering apparatus can be enhanced.

Where the steering wheel 2 is operated away from the steering angle midpoint, a necessary steering assist force can immediately be generated, so that a satisfactory steering feeling can be ensured.

When a force applied to the steering wheel 2 is removed after the wheels of the vehicle have been steered in one direction, a self-alignment torque is exerted on the steering mechanism 1, whereby the wheels are liable to be steered in the other direction to return to a straight traveling state. Due to this reverse input from the wheels, the steering shaft 3 is turned, so that a steering angular speed corresponding thereto is added.

In the conventional power steering apparatus which is adapted to perform the motor rotation control in the same manner for the steering operation of the steering wheel away from the steering angle midpoint and for the steering operation toward the steering angle midpoint, the motor rotation speed is increased due to the steering angular speed added by the reverse input to increase a pump flow rate and hence the hydraulic pressure. That is, a back pressure is increased to interfere with smooth return of the steering wheel to the steering angle midpoint.

In the power steering apparatus according to this embodiment, conversely, the motor rotation speed R is set at a lower level when the steering wheel 2 is operated toward the steering angle midpoint, so that the increase in the back pressure is suppressed. Hence, there is no possibility to interfere with the smooth return of the steering wheel 2 to the steering angle midpoint.

Figure 4:
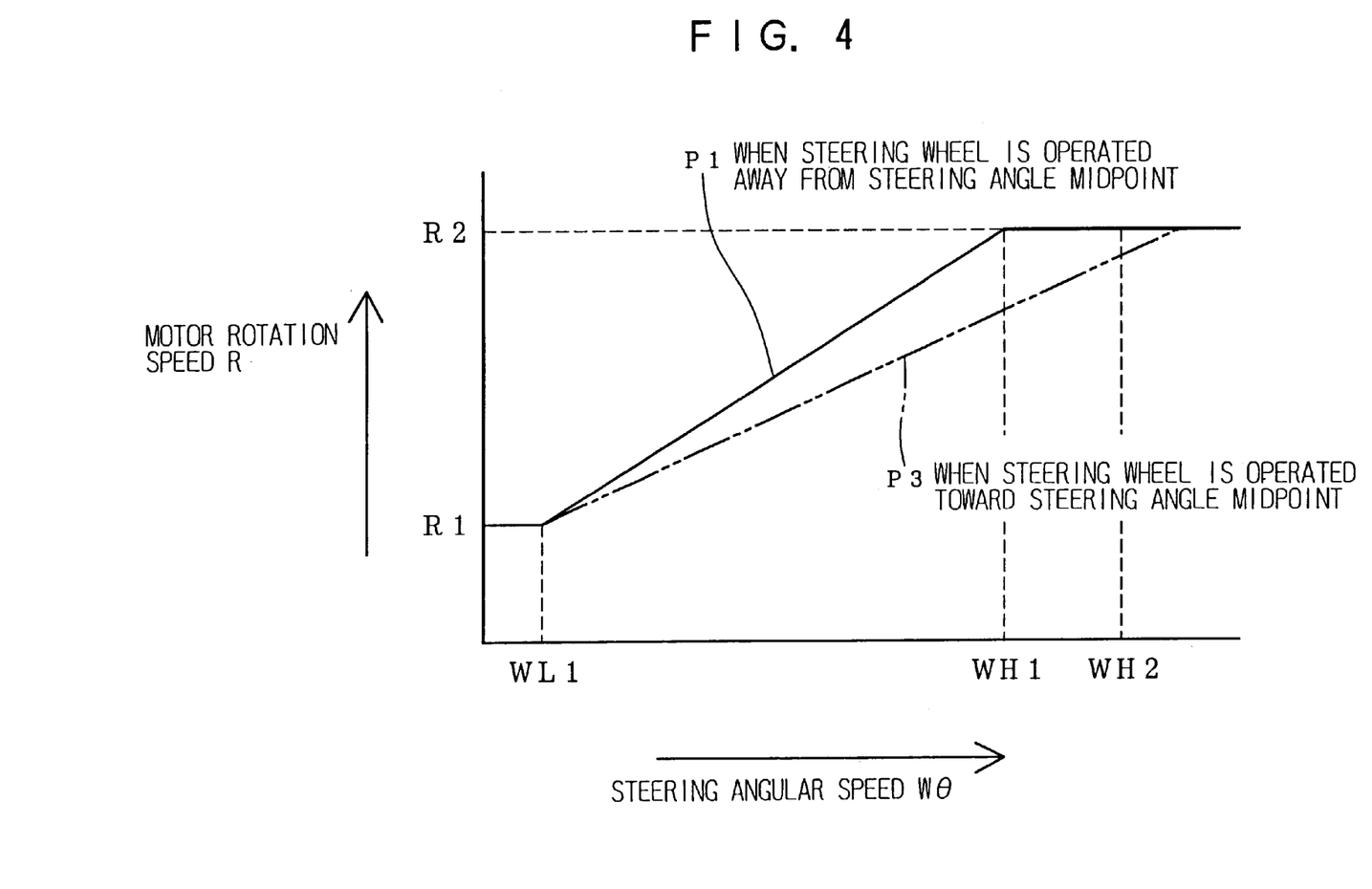
FIG. 4 is a graph showing another exemplary setting of the motor rotation speed with respect to the steering angular speed.

While one embodiment of the present invention has thus been described, the present invention may be embodied in any other ways. In the embodiment described above, when the steering wheel is operated toward the steering angle midpoint, the motor rotation speed R is determined in accordance with the characteristic line P2 obtained by the rightward parallel shift of the characteristic line P1 which is to be employed for the determination of the motor rotation speed R when the steering wheel is operated away from the steering angle midpoint. However, as shown in FIG. 4, the motor rotation speed R to be employed for the steering operation of the steering wheel toward the steering angle midpoint may be determined in accordance with a characteristic line P3 which has a smaller inclination, in a range where the steering angular speed Wθ is greater than the threshold WL1, than the characteristic line P1 which is to be employed for the determination of the motor rotation speed R in the steering operation away from the steering angle midpoint. In this case, the same effects as offered in the aforesaid embodiment can be ensured.

Figure 5:
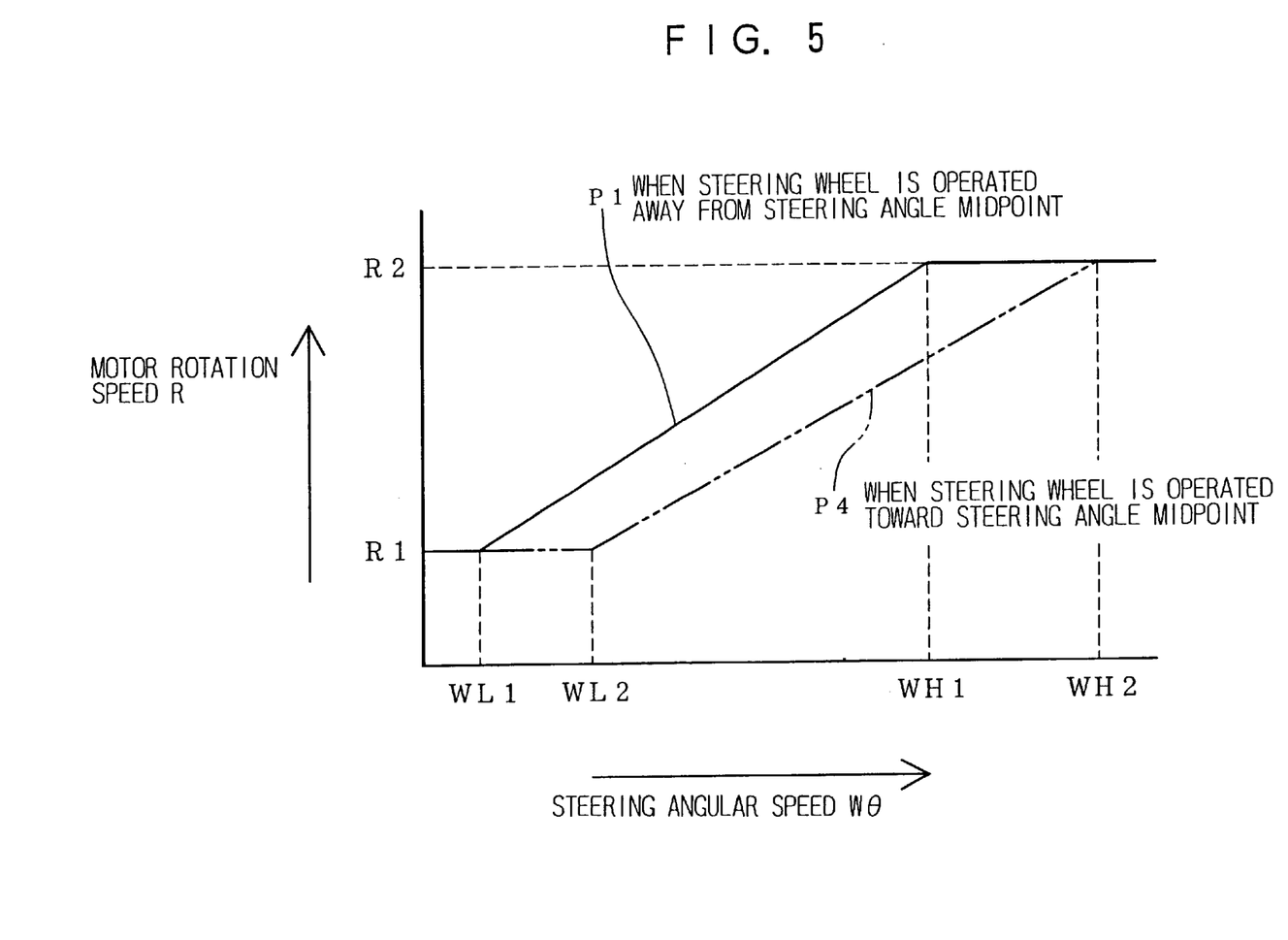
FIG. 5 is a graph showing further another exemplary setting of the motor rotation speed with respect to the steering angular speed.

Further, as shown in FIG. 5, a characteristic line P4 which is obtained by shifting the characteristic line P1 rightward in parallelism and reducing the inclination of the resulting line may be employed for the determination of the motor rotation speed R when the steering wheel 2 is operated toward the steering angle midpoint.

While the present invention has been described in detail by way of the embodiments thereof, it should be understood that the foregoing disclosure is merely illustrative of the technical principles of the present invention but not limitative of the same. The spirit and scope of the present invention are to be limited only by the appended claims.

This application claims priority benefits under the Convention on the basis of Japanese Patent Application No. 10-265216 filed to the Japanese Patent Office on Sep. 18, 1998, the disclosure thereof being incorporated herein by reference.

What is claimed is:

1. A power steering apparatus, comprising:

steering direction detection mechanism that senses a direction of steering operation of a steering mechanism;

steering angular speed detection mechanism that senses a steering angular speed when the steering mechanism is operated; and motor control circuit that determines a rotation speed of an electric motor in accordance with the steering angular speed sensed by the steering angular speed detection mechanism, and controls driving of the electric motor on the basis of an output of the steering direction detection mechanism so that, with respect to a given steering angular speed, the motor rotation speed is set at a lower value when the steering mechanism is operated toward a steering angle midpoint than when the steering mechanism is operated away from the steering angle midpoint, wherein said motor drives a pump for generating hydraulic pressure that generates a steering assist force to be applied to the steering mechanism, and wherein the motor control circuit determines the motor rotation speed with respect to the steering angular speed sensed by the steering angular speed detection mechanism in accordance with a first characteristic line which defines a linear relationship between the steering angular speed and the motor rotation speed for the steering operation away from the steering angle midpoint, and in accordance with a second characteristic line which defines a linear relationship between the steering angular speed and the motor rotation speed for the steering operation toward the steering angle midpoint, the second characteristic line defining the relationship such that the steering angular speed with respect to the motor rotation speed of the second characteristic line that is greater than the steering angular speed with respect to the motor rotation speed of the first characteristic line.

2. A power steering apparatus as set forth in claim 1, wherein the first and second characteristic lines are each defined so that the motor rotation speed varies generally linearly with the steering angular speed.

3. A power steering apparatus as set forth in claim 1, wherein the motor control circuit rotates the electric motor at a lower limit motor rotation speed in the steering operation away from the steering angle midpoint if the steering angular speed is not greater than a first lower limit, and rotates the electric motor at the lower limit motor rotation speed in the steering operation toward the steering angle midpoint if the steering angular speed is not greater than a second lower limit which is greater than the first lower limit.

4. A power steering apparatus as set forth in claim 1, wherein the motor control circuit rotates the electric motor at an upper limit motor rotation speed in the steering operation away from the steering angle midpoint if the steering angular speed is not smaller than a first upper limit, and rotates the electric motor at the upper limit motor rotation speed in the steering operation toward the steering angle midpoint if the steering angular speed is not smaller than a second upper limit which is greater than the first upper limit.

\* \* \* \* \*